US007518272B2

(12) United States Patent
Yeh et al.

(10) Patent No.: US 7,518,272 B2

(45) Date of Patent: Apr. 14, 2009

(54) ELECTRIC FAN WITH BEARING

(75) Inventors: Chin-Wen Yeh, Tu-Cheng (TW); Chin-Long Ku, Tu-Cheng (TW); Hsieh-Kun Lee, Tu-Cheng (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 412 days.

(21) Appl. No.: 11/462,655

(22) Filed: Aug. 4, 2006

(65) Prior Publication Data

US 2007/0267928 A1 Nov. 22, 2007

(30) Foreign Application Priority Data

May 19, 2006 (CN) ........................ 2006 1 0060720

(51) Int. Cl.
*H02K 21/28* (2006.01)
*F04D 29/00* (2006.01)

(52) U.S. Cl. .................. 310/67 R; 310/90; 417/423.12; 384/903

(58) Field of Classification Search ................... 310/90, 310/67 R; 384/100, 295, 416, 428, 903; 417/423.12

See application file for complete search history.

(56) References Cited

U.S. PATENT DOCUMENTS 4,559,462 A * 12/1985 Hernandez-Badillo .... 310/67 A
4,783,608 A * 11/1988 Gruber et al. ................. 310/90
6,084,328 A * 7/2000 Yamashita et al. ............ 310/90
6,310,415 B1 * 10/2001 Horng ......................... 310/90
6,726,450 B2 4/2004 Lee et al.
6,897,586 B2 * 5/2005 Horng et al. .................. 310/90

FOREIGN PATENT DOCUMENTS

CN 2371380 Y 3/2000
CN 2668899 Y 1/2005
TW 492520 6/2002

* cited by examiner

*Primary Examiner*—Karl Tamai
*Assistant Examiner*—David W. Scheuermann

(57) ABSTRACT

An electric fan includes a fan base (10), a bearing (40) and a rotor assembly (20). The fan base forms a central tube (11) receiving the bearing therein. The rotor assembly includes a fan hub (22), and a pivot axle (23) joined to the fan hub. The pivot axle pivotably extends into the bearing. A first and second locking rings (50, 70) are received in the central tube. Each of the first and second locking rings defines a central bore (52) therein. The pivot axle is engaged in the central bores of the first and second locking rings. The first locking ring is located at a top of the bearing and the second locking ring is located at a bottom of the bearing to prevent the rotor assembly from escaping from the bearing when the fan is operated.

18 Claims, 5 Drawing Sheets

ELECTRIC FAN WITH BEARING

FIELD OF THE INVENTION

The present invention relates generally to an electric fan with a rotor assemble and a bearing, and more particularly to an electric fan having a double locking ring to prevent the rotor assembly of the fan escaping from the bearing.

DESCRPIPTION OF RELATED ART

As ICs (integrated circuits) such as computer CPUs (central processing units) are being designed to run faster and faster, more and more heat is being generated by these ICs. Electric fans are typically used to dissipate the heat generated by these ICs.

Referring to FIG. 5, a related fan 90 includes a fan base 91, a stator assembly 92 and a rotor assembly 93 pivotable with respect to the stator assembly 92. A bearing 94 is secured within a sleeve 95 of the stator assembly 92 and is usually used to pivotably support a pivot axle 96 of the rotor assembly 93. A sealing lid 80 is mounted on a bottom of the sleeve 95. Lubricant oil is stored in a space 82 surrounded by the sealing lid 80 and the sleeve 95. The pivot axle 96 extending through the space 82 defines an annular recess 97 in a distal end thereof. A locking ring 98 is engaged in the recess 97 for holding the rotor assembly 92 on the fan base 91, to thereby prevent the rotor assembly 92 from being thrown from the bearing 94 under centrifugal force generated by the pivot axle 96 as the fan operates at high speed.

However, as power requirements of the fan increase, the fan will continue to increase in speed until it reaches full speed for maximum cooling. Thus, only using one locking ring 98 as an anti-release device is insufficient, especially when the fan operates at full speed, and as a result the rotor assembly 92 is liable to escape from the bearing 94. Therefore, it is an objective of the invention to provide a double locking ring for use in an electric fan to mitigate and/or obviate the aforementioned problems.

SUMMARY OF THE INVENTION

According to a preferred embodiment of the present invention, an electric fan includes a fan base, a bearing and a rotor assembly. The fan base forms a central tube receiving the bearing therein. The rotor assembly includes a fan hub, and a pivot axle joined to the fan hub. The pivot axle pivotably extends into the bearing. First and second locking rings are received in the central tube. Each of the first and second locking rings defines a central bore therein. The pivot axle is engaged in the central bores of the first and second locking rings. The first locking ring is located at a top of the bearing and the second locking ring is located at a bottom of the bearing to prevent the rotor assembly from escaping from the bearing as the fan is operated at high speed.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

DETAILED DESCRIPTION OF THE INVENTION

Figure 1:
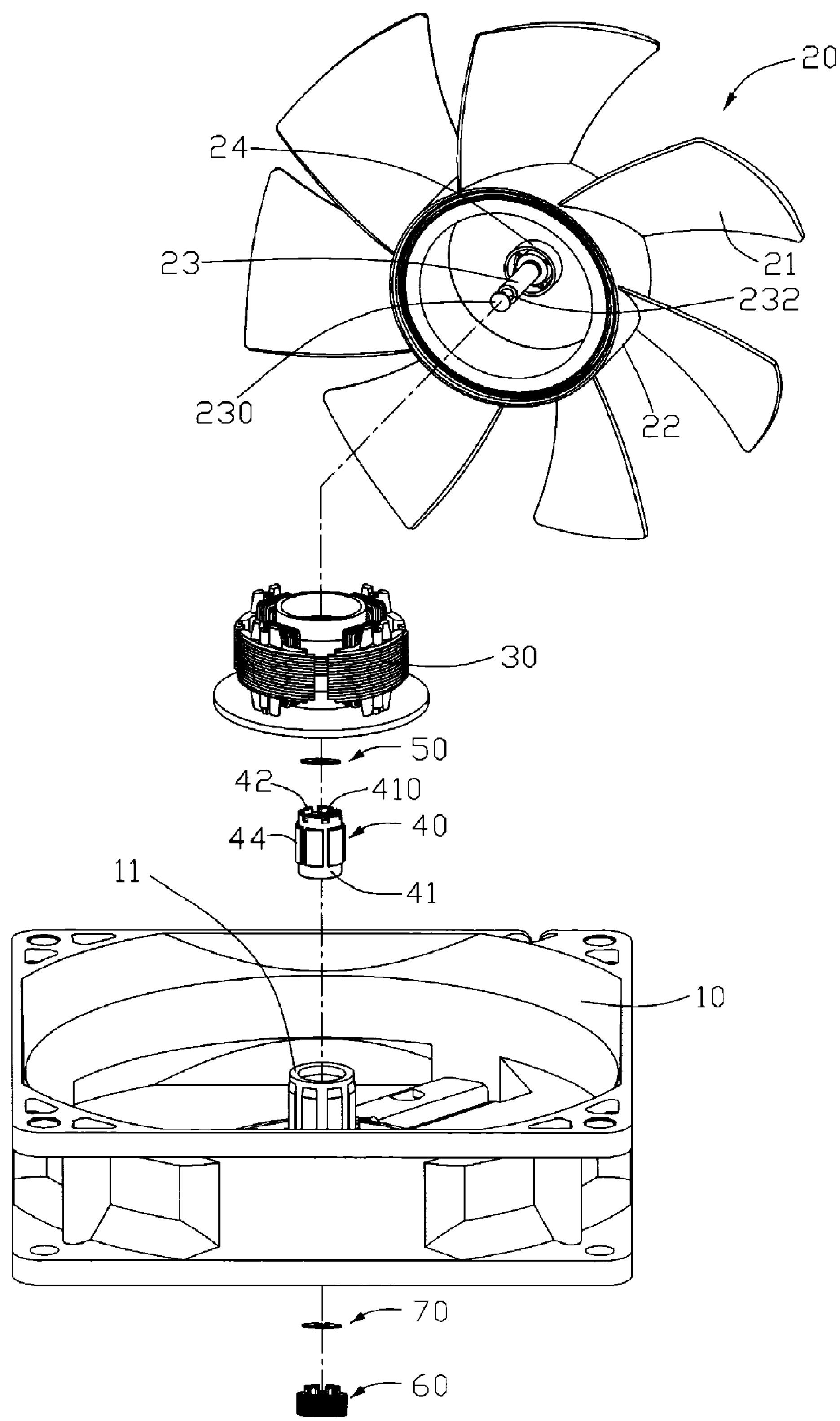
FIG. 1 is an exploded, isometric view of an electric fan in accordance with a preferred embodiment of the present invention.

FIG. 1 illustrates by way of example an electric fan in accordance with a preferred embodiment of the present invention. The fan comprises a fan base 10, a rotor assembly 20, a stator assembly 30, a bearing 40, and a first and second locking rings 50, 70 located at two opposing ends of the bearing 40 for preventing the rotor assembly 20 from escaping from the bearing 40 as the fan is operated. The rotor assembly 20 is pivotable with respect to the stator assembly 30.

Figure 4:
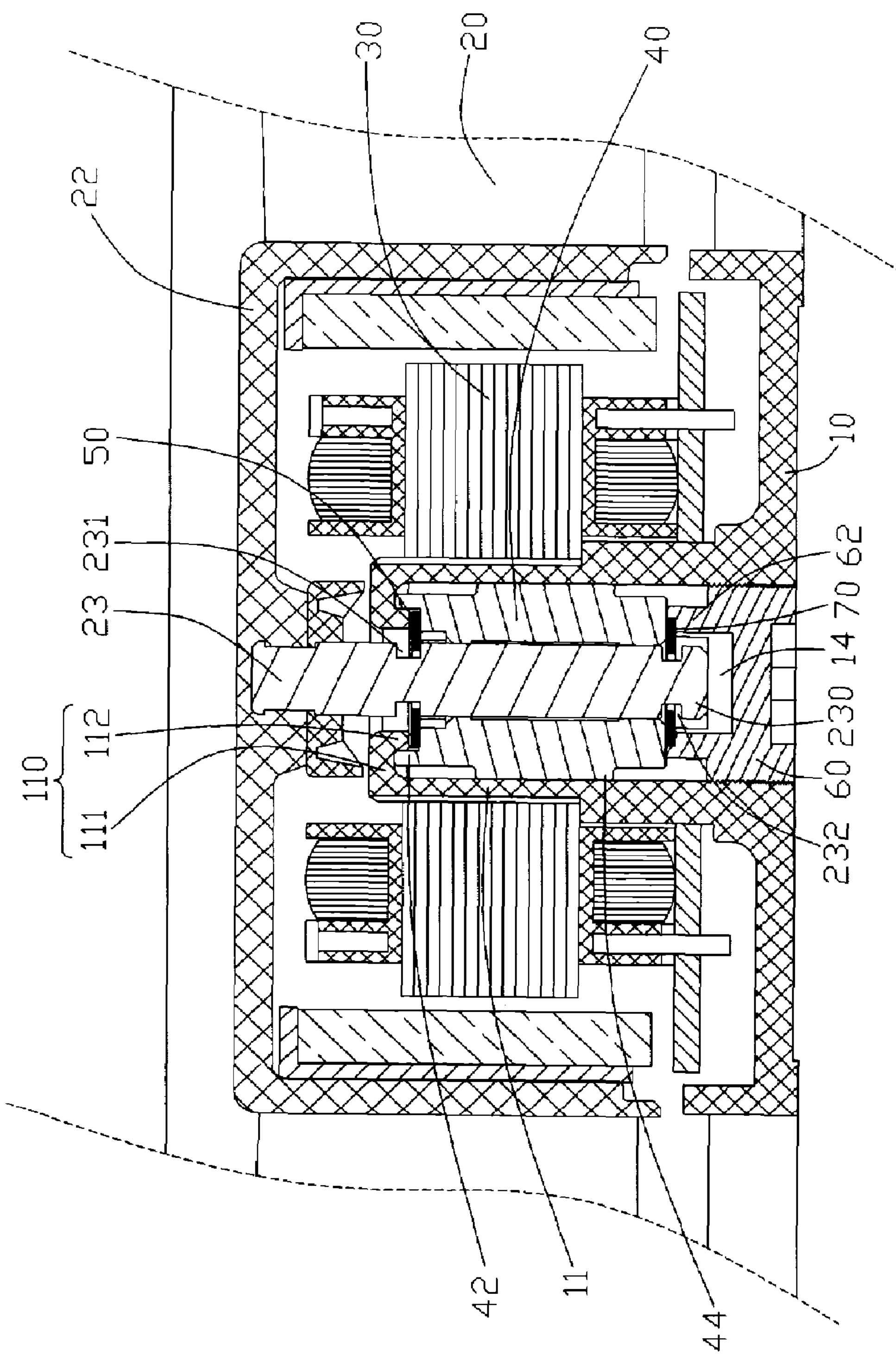
FIG. 4 is an assembled, cross-sectional view of the electric fan of FIG. 1.
Figure 5:
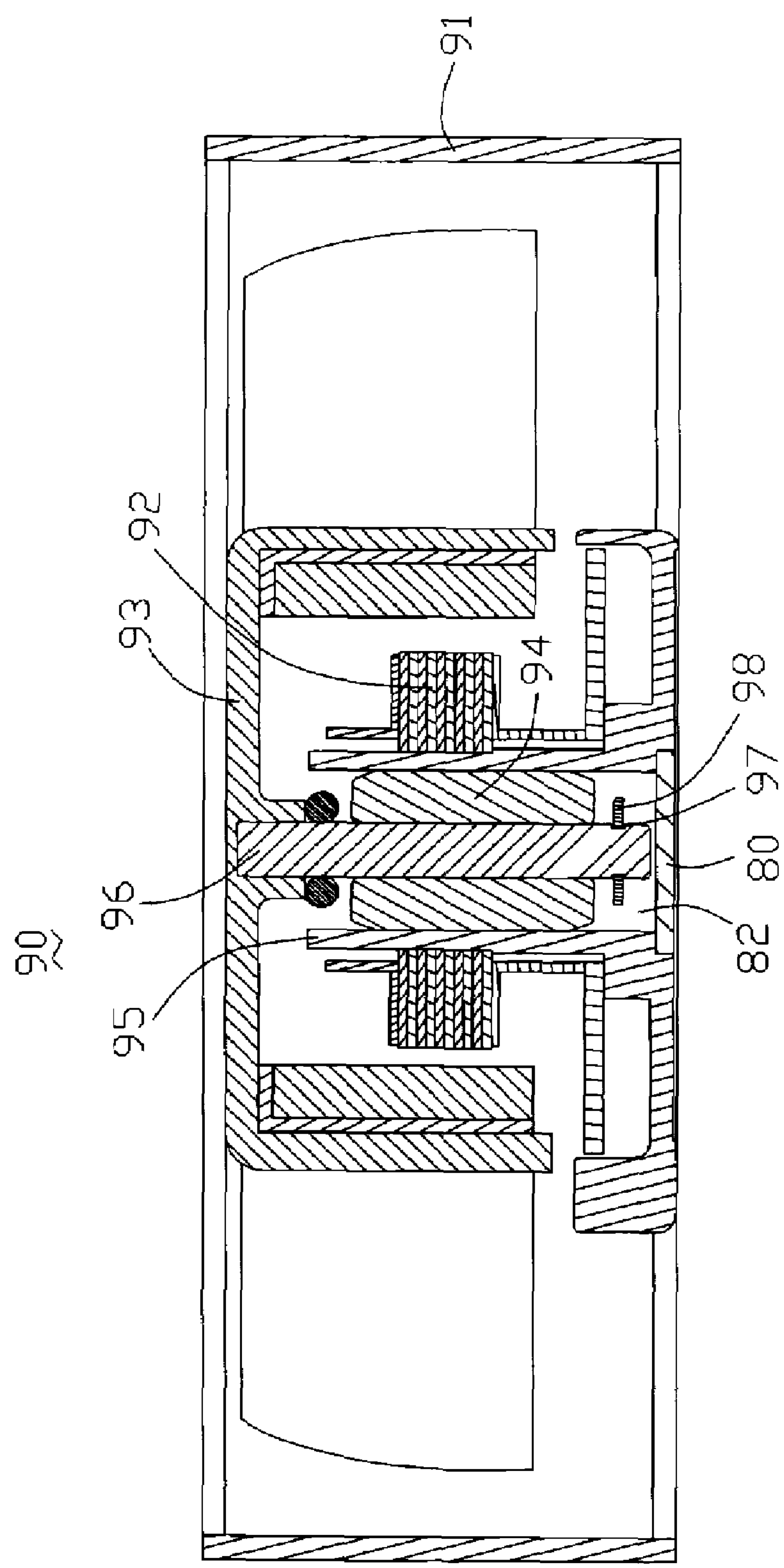
FIG. 5 is a cross-sectional view of a related fan.

The fan base 10 defines a cavity (not labeled) therein for receiving the rotor assembly 20 and the stator assembly 30 therein. A central tube 11 is formed at a central portion of the fan base 10. The central tube 11 has a hollow and cylindrical configuration. Referring also to FIG. 4, the bearing 40 is engagingly received in the central tube 11. The stator assembly 30 is attached around the central tube 11. A sealing lid 60 is mounted on a bottom of the central tube 11.

Figure 2:
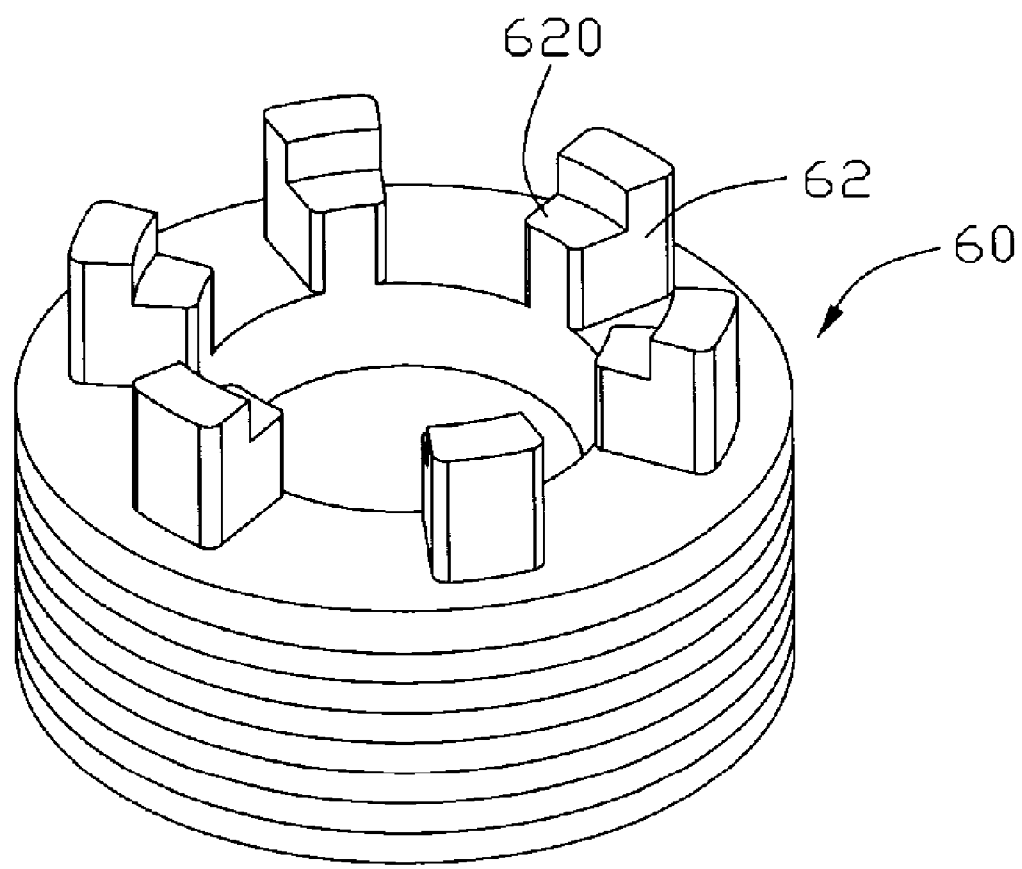
FIG. 2 is an enlarged and isometric view of a sealing lid of the electric fan of FIG. 1.

Referring also to FIG. 2, the sealing lid 60 forms a plurality of protruding blocks 62 at a top thereof. The protruding blocks 62 abut against a bottom of the bearing 40 for supporting the bearing 40, thereby preventing the bearing 40 becoming deflected from its original position as the fan is operated. A step 620 is formed on each protruding block 62 for receiving the second locking ring 70 thereon. The steps 620 are located at an inner side of the protruding blocks 62. A baffle element 110 bends from a top of a circumferential wall (not labeled) of the central tube 11 and engages with the bearing 40 so as to prevent lubricating oil from leaking from a top end of the bearing 40. The baffle element 110 comprises an annular connecting portion 111 extending perpendicularly, horizontally and inwardly from a top of the circumferential wall of the center tube 11 and a leg 112 extending perpendicularly and downwardly from an inner end of the connecting portion 111. A lubricant reservoir 14 is formed in the fan base 10 below the bearing 40 and above the sealing lid 60, which supplies lubricant oil as the fan is operated.

Referring to FIGS. 1 and 4, The bearing 40 has a cylindrical shape, and has a cylindrical outer wall 41. A central hole 410 is defined in a central portion of the bearing 40 for receiving a pivot axle 23 of the rotor assembly 20 therein. A plurality of evenly spaced protrusions 42 extend upwardly from a top end of the outer wall 41. A plurality of evenly spaced bulwarks 44 corresponding to the protrusions are circumferentially formed on the outer wall 41 for abutting against an inner surface of the central tube 11.

The rotor assembly 20 comprises a generally cup-like fan hub 22 having a top wall (not labeled) and a periphery wall (not labeled) extending downwardly a circumference of the top wall. A plurality of fan blades 21 are formed around the periphery wall of the fan hub 22. An axle seat 24 is formed on a center of the top wall. The pivot axle 23 extends perpendicularly downwards from the top wall of the fan hub 22 and has an upper portion surrounded by the axle seat 24. A first annular slot 231 (shown in FIG. 4) positioned corresponding to a top of the bearing 40 is defined in the pivot axle 23 for receiving the first locking ring 50. The first locking ring 50 is sandwiched between a top of the bearing 40 and a bottom of the leg 112 of the baffle element 110. A semispherical-shaped guiding portion 230 is formed at a distal end of the pivot axle 23. A second annular slot 232 is defined in the vicinity of the guiding portion 230 for receiving the second locking ring 70. The second locking ring 70 is sandwiched between a bottom of the bearing 40 and the steps 620 of the protruding blocks 62 of the sealing lid 60.

Figure 3:
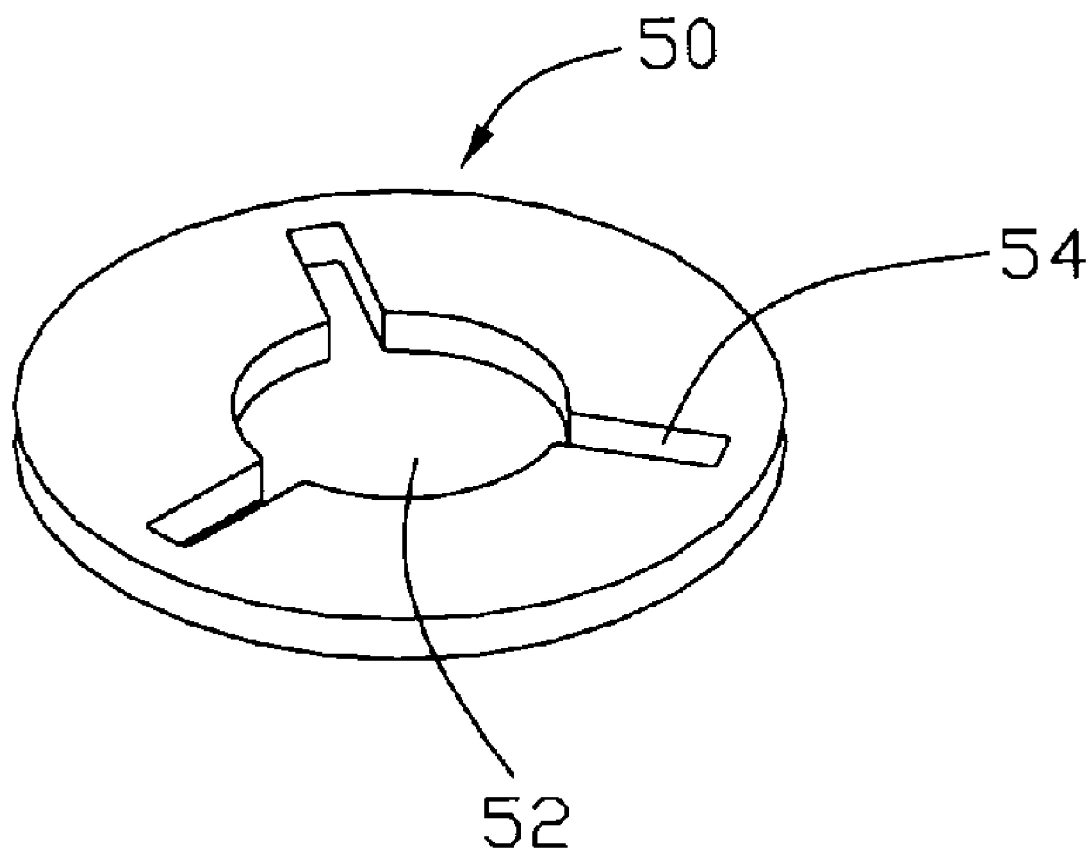
FIG. 3 is an enlarged and isometric view of a locking ring of the electric fan of FIG. 1.

Referring to FIG. 3, the first locking ring 50 has a plate-like configuration. The first locking ring 50 defines a central bore 52 therein. The central bore 52 has a diameter smaller than that of the pivot axle 23 at a middle portion thereof and larger than that of the pivot axle 23 at the first annular slot 231. A plurality of elongated slots 54 communicating with the central bore 52 are defined around the central bore 52 for providing elasticity to the first locking ring 50, whereby the pivot axle 23 can extend through the central bore 52 to reach a position in which an inner edge portion (not labeled) of the first locking ring 50 around the central bore 52 extends into the first annular slot 231. The second locking ring 70 has the same configuration as the first locking ring 50.

When the fan operates at high speed, the first and second locking rings 50, 70 located at two opposite ends of the bearing 40 can take advantage of the anti-release action of the rotor assembly 20 in an axial direction, thereby preventing the rotor assembly 20 from escaping from the bearing 40. Simultaneously, the first locking ring 50 located between the top of the bearing 40 and the leg 112 of the baffle element 110 can prevent the lubricant oil from leaking from a gap between the leg 112 of the baffle element 110 and the pivot axle 23. Even if there is a leakage, the axle seat 24 is configured to collect the leaked lubricant and guide it to flow back to the bearing 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electric fan comprising:

a fan base comprising a central tube;

a bearing received in the central tube;

a rotor assembly comprising a fan hub, and a pivot axle joined to the fan hub and pivotably extending into the bearing; and a first and second locking rings received in the central tube, each of the first and second locking rings defining a central bore therein, the pivot axle engaged in the central bores of the first and second locking rings;

wherein the first locking ring is located at a top of the bearing and the second locking ring is located at a bottom of the bearing to prevent the rotor assembly from escaping from the bearing during operation of the electronic fan.

2. The electric fan of claim 1, wherein a first annular slot is defined in an upper portion of the pivot axle, positioned corresponding to the top of the bearing for receiving the first locking ring therein.

3. The electric fan of claim 2, wherein a second annular slot is defined in a lower portion of the pivot axle, positioned corresponding to the bottom of the bearing for receiving the second locking ring therein.

4. The electric fan of claim 3, wherein the central bore of each of the first and second locking rings has a diameter smaller than that of the pivot axle at a middle portion thereof and larger than that of the pivot axle at each of the first and second annular slots.

5. The electric fan of claim 1, wherein each of the first and second locking rings has a plate-like configuration.

6. The electric fan of claim 1, wherein the bearing comprises an outer wall and a plurality of evenly spaced protrusions extending upwardly from a top end of the outer wall of the bearing.

7. The electric fan of claim 6, wherein the central tube comprises a periphery wall and a baffle element bent from a top end of the periphery wall, and the baffle element engages with the protrusions of the bearing.

8. The electric fan of claim 7, wherein the baffle element comprises a connecting portion extending perpendicularly and inwardly from the top of the periphery wall of the central tube and a leg extending downwardly from an inner end of the connecting portion, wherein the top of the bearing engages with a bottom of the connecting portion.

9. The electric fan of claim 8, wherein the first locking ring is sandwiched between the top of the bearing and a bottom of the leg of the baffle element.

10. The electric fan of claim 1, wherein a sealing lid is mounted on a bottom of the central tube.

11. The electric fan of claim 10, wherein the sealing lid comprises a plurality of protruding blocks extending upwardly from a top of thereof, the protruding blocks abutting against the bottom of the bearing.

12. The electric fan of claim 11, wherein steps are formed at an inner side of the protruding blocks for receiving the second locking ring thereon.

13. The electric fan of claim 12, wherein the second locking ring is sandwiched between the bottom of the bearing and the steps of the protruding blocks of the sealing lid.

14. The electric fan of claim 1, wherein each of the first and second locking rings defines a plurality of elongated slots around and communicating with the central bore thereof, for providing elasticity to the first and second locking rings.

15. The electric fan of claim 1, wherein a plurality of evenly spaced bulwarks are circumferentially formed on an outer wall of the bearing for abutting against an inner surface of the central tube.

16. An electrical fan comprising:

a base forming a central tube;

a sealing lid sealing a bottom opening of the central tube;

a bearing received in the central tube above the sealing lid;

a rotor having a pivot axle rotatably extending in the bearing, the pivot axle defining a first annular slot adjacent to a top of the bearing and a second annular slot adjacent to a bottom of the bearing;

a first locking ring having an inner portion engaging in the first annular slot and an outer portion sandwiched between the central tube and the bearing; and a second locking ring having an inner portion engaging in the second annular slot and an outer portion sandwiched between the bearing and the sealing lid.

17. The electrical fan of claim 16, wherein the central tube has a baffle element extending inwardly from a top of a periphery wall of the central tube, the baffle element having a leg downwardly extended to engage with the first locking ring.

18. The electrical fan of claim 16, wherein the sealing lid has an upper protrusion forming a step, the second locking ring being received in the step.

* * * * *